(12) United States Patent
Quijano et al.

(10) Patent No.: US 8,622,455 B2
(45) Date of Patent: Jan. 7, 2014

(54) INSTRUMENT PANEL ASSEMBLY (75) Inventors: Jonathan Joseph Quijano, Ann Arbor, MI (US); Hisamitsu Tatsunami, Toyota (JP)

(73) Assignees: Toyota Motor Engineering & Manufacturing North America, Inc., Erlanger, KY (US); Toyota Motor Corporation, Toyota Aichi (JP)

( * ) Notice: Subject to any disclaimer, the term of this patent is extended or adjusted under 35 U.S.C. 154(b) by 0 days.

(21) Appl. No.: 13/436,075

(22) Filed: Mar. 30, 2012

(65) Prior Publication Data
US 2013/0257084 A1 Oct. 3, 2013

(51) Int. Cl.
*B60R 7/04* (2006.01)
*B60R 7/06* (2006.01)

(52) U.S. Cl.
USPC .................... 296/37.1; 296/37.8; 224/281

(58) Field of Classification Search
USPC .............. 296/24.34, 37.1, 37.8, 37.12, 37.13, 296/100.03, 136.04, 136.05; 224/281, 483, 224/551, 539
See application file for complete search history.

(56) References Cited

U.S. PATENT DOCUMENTS

| | | | |
|---|---|---|---|
| 4,005,367 A | 1/1977 | Dano | |
| 4,024,737 A | 5/1977 | McInturff | |
| 4,089,464 A | 5/1978 | Teti, Jr. et al. | |
| 4,103,982 A | 8/1978 | Rudd | |
| 4,660,900 A | 4/1987 | Paterlini | |
| 4,974,898 A * | 12/1990 | Baranski | 296/100.03 |
| 5,073,978 A | 12/1991 | Mastrippolito | |
| 5,169,223 A | 12/1992 | Suzuki et al. | |
| 5,261,502 A | 11/1993 | Kronholm, Jr. | |
| 5,340,022 A | 8/1994 | Arold et al. | |
| 5,871,283 A | 2/1999 | Isobe et al. | |
| 6,219,323 B1 | 4/2001 | Fukatsu et al. | |
| 7,407,212 B2 | 8/2008 | Kataoka et al. | |
| 7,900,988 B2 | 3/2011 | Ryu | |
| 8,052,192 B2 | 11/2011 | Groeller et al. | |
| 2001/0042812 A1 | 11/2001 | Perzewski | |
| 2003/0178434 A1 | 9/2003 | Kato | |
| 2009/0079313 A1 | 3/2009 | Brunner et al. | |
| 2011/0221224 A1 | 9/2011 | Fowler | |

\* cited by examiner

*Primary Examiner* — Glenn Dayoan
*Assistant Examiner* — Jason S Daniels
(74) *Attorney, Agent, or Firm* — Gifford, Krass, Sprinkle, Anderson & Citkowski, P.C.

(57) ABSTRACT

A storage compartment configured to attach to a structure, and a method of assembling an instrument panel is provided. The storage compartment includes a base and a cover disposed above the base. The cover includes a first top portion, a second top portion, and a stop. The first top portion is fixedly mounted to the support portion of the base. The second top portion is movable between a retracted position and an extended position, in the retracted position the second top portion is substantially disposed over the first top portion, in the extended position, the second back wall of the second top portion is displaced from the first top portion. Once the second top portion of the cover is moved to the extended position, the stop engages the second top portion so as to prevent the second top portion from moving to the retracted position.

21 Claims, 8 Drawing Sheets

INSTRUMENT PANEL ASSEMBLY

FIELD OF THE INVENTION

The invention relates to a storage compartment and a method of assembling storage compartment. More particularly, the invention relates to storage compartment having a telescopic cover operable to facilitate the installation of the storage compartment into a tight space.

BACKGROUND OF THE INVENTION

Storage compartments mounted to a structure such as the instrument panel assembly of an automotive vehicle are known. The storage compartment may include a base having a bottom wall, a pair of side walls, a front wall and a back wall. The bottom, side, front and back walls are interconnected so as to define a storage bin. The storage compartment may further include a tray disposed above the storage bin between respective side walls. The tray may be slidable between a first position and a second position. In the first position the tray covers the bottom wall, in the second position the tray is displaced from the front wall so as to provide access to the storage bin. In instances where the tray is covered, the cover is configured to be dimensioned so as to cover the tray when the tray is in the second position. Thus, mounting the storage compartment to a structure such as an instrument panel assembly may be difficult as there must be sufficient space to accommodate the cover.

SUMMARY OF THE INVENTION

According to one aspect of the invention a storage compartment configured to attach to a structure is provided. The storage compartment includes a base. The base includes a support portion. The base may further include includes a bottom wall, a pair of side walls, a front wall and a back wall, the bottom, side, front and back walls interconnected so as to define a storage bin. The support portion is disposed on one of the pair of side walls.

The storage compartment further includes a cover. The cover is disposed above the base. The cover includes a first top portion, a second top portion, and a stop. The first and second top portions are displaceable with respect to each other along an axis so as to form a telescopic cover. The stop is configured to retain the second top portion in a fixed position with the first top portion after the first and second top portion are displaced relative to each other.

The first top portion is fixedly mounted to the support portion of the base. The second top portion is movable between a retracted position and an extended position, in the retracted position the second top portion is substantially disposed over the first top portion, in the extended position, the second back wall of the second top portion is displaced from the first top portion. Once the second top portion of the cover is moved to the extended position, the stop engages the second top portion so as to prevent the second top portion from moving to the retracted position.

The storage compartment may further include a tray spaced apart from the bottom wall. The tray may be slidably disposed between each of the side walls. The tray is movable between a first position, wherein the tray covers the bottom wall, and a second position, wherein the tray provides access to the storage bin and is positioned underneath the cover.

According to another aspect of the invention an instrument panel assembly is provided. The instrument panel assembly includes a slidable tray disposed over a base. The base includes a bottom wall, a pair of side walls, a front wall and a back wall. The bottom, side, front and back walls are interconnected so as to define a storage bin. The base may further include a support portion. The tray is slidable between a first position and a second position, in the first position the tray covers the bottom wall, in the second position the tray is displaced from the front wall and substantially behind the back wall so as to provide access to the storage bin.

The instrument panel assembly further includes a cover having a first top portion and a second top portion displaceable with respect to the first top portion. The first top portion includes a mounting portion and a stop. The mounting portion is fixedly mounted to the support portion of the base. The second top portion is movable between a retracted position and an extended position. In the retracted position the second top portion is substantially disposed over the first top portion, in the extended position, the second back wall of the second top portion is displaced from the first top portion so as to accommodate the tray when the tray is in the second position.

According to yet another aspect of the invention, a method of assembling an instrument panel assembly is provided. The instrument panel assembly includes a storage compartment having a slidable tray. The storage compartment includes a base having a bottom wall, a pair of side walls, a front wall and a back wall, the bottom, side, front and back walls interconnected so as to define a storage bin. The slidable tray is disposed above the storage bin and is movable between a first position and a second position. In the first position the tray covers the storage bin, in the second position the tray is displaced from the front wall so as to provide access to the storage bin.

The method of assembling the instrument panel assembly includes the steps of providing a cover having a first top portion and a second top portion displaceable with respect to the first top portion. The first top portion includes a mounting portion and a stop configured to prevent the second top portion from moving to the retracted position. The second top portion is movable between a retracted position and an extended position, in the retracted position the second top portion is substantially disposed over the first top portion, in the extended position, the second back wall of the second top portion is displaced from the first top portion so as to accommodate the tray when the tray is in the second position.

The method proceeds to the step of attaching the mounting portion to the support portion of the base so as to fix the first top portion to the base. The method proceeds to the step of extending the second top portion to the retracted position past the stop so as to provide a space to accommodate the slidable tray in the second position.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE INVENTION

With reference now to FIGS. 1-7, According to one aspect of the invention a storage compartment 10 configured to attach to a structure is provided. The storage compartment 10 may be made from a durable and resilient material such as injected molded polymers. The storage compartment 10 is configured so as to hold articles.

The storage compartment 10 includes a base 12. The base 12 includes a support portion 14. The base 12 may further include includes a bottom wall 16, a pair of side walls 18, a front wall 20 and a back wall 22, the bottom, side, front and back walls 16, 18, 20, 22 interconnected so as to define a storage bin 24. The support portion 14 is disposed on one of the pair of side walls 18. The support portion 14 may be a generally planar surface adapted to receive a fastening device such as a screw or an adhesive, alternatively, the support portion 14 may provide a surface for a component to be vibrationally welded thereto.

The storage compartment 10 further includes a cover 26. The cover 26 made from a durable and resilient material such as injected molded polymers. The cover 26 is disposed above the base 12. The cover 26 includes a first top portion 28, a second top portion 30, and a stop 32. The first and second top portions 28, 30 are displaceable with respect to each other along an axis so as to form a telescopic cover 26.

Figure 2:
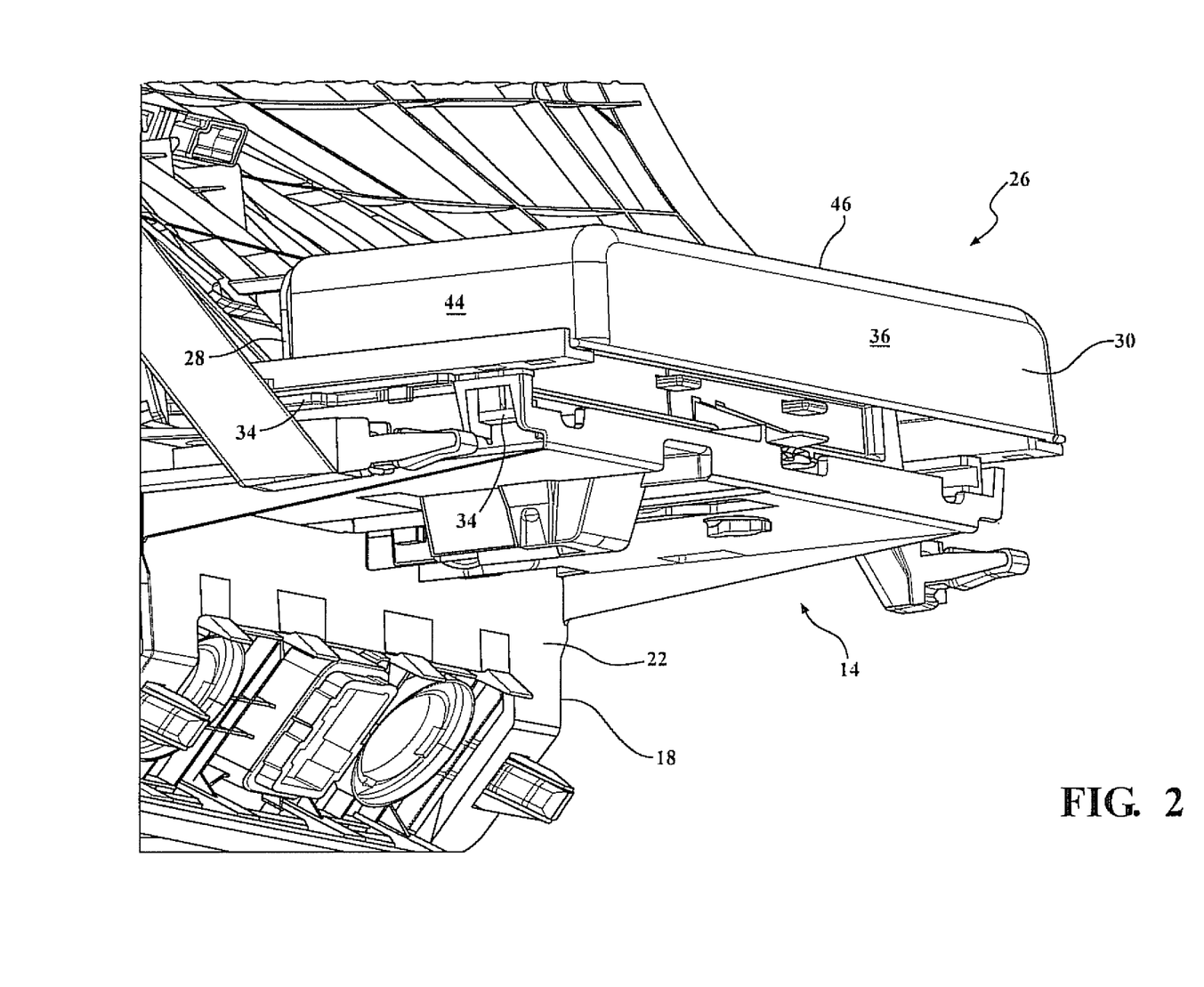
FIG. 2 is a perspective view of the back side of the storage compartment in the retracted position.
Figure 3:
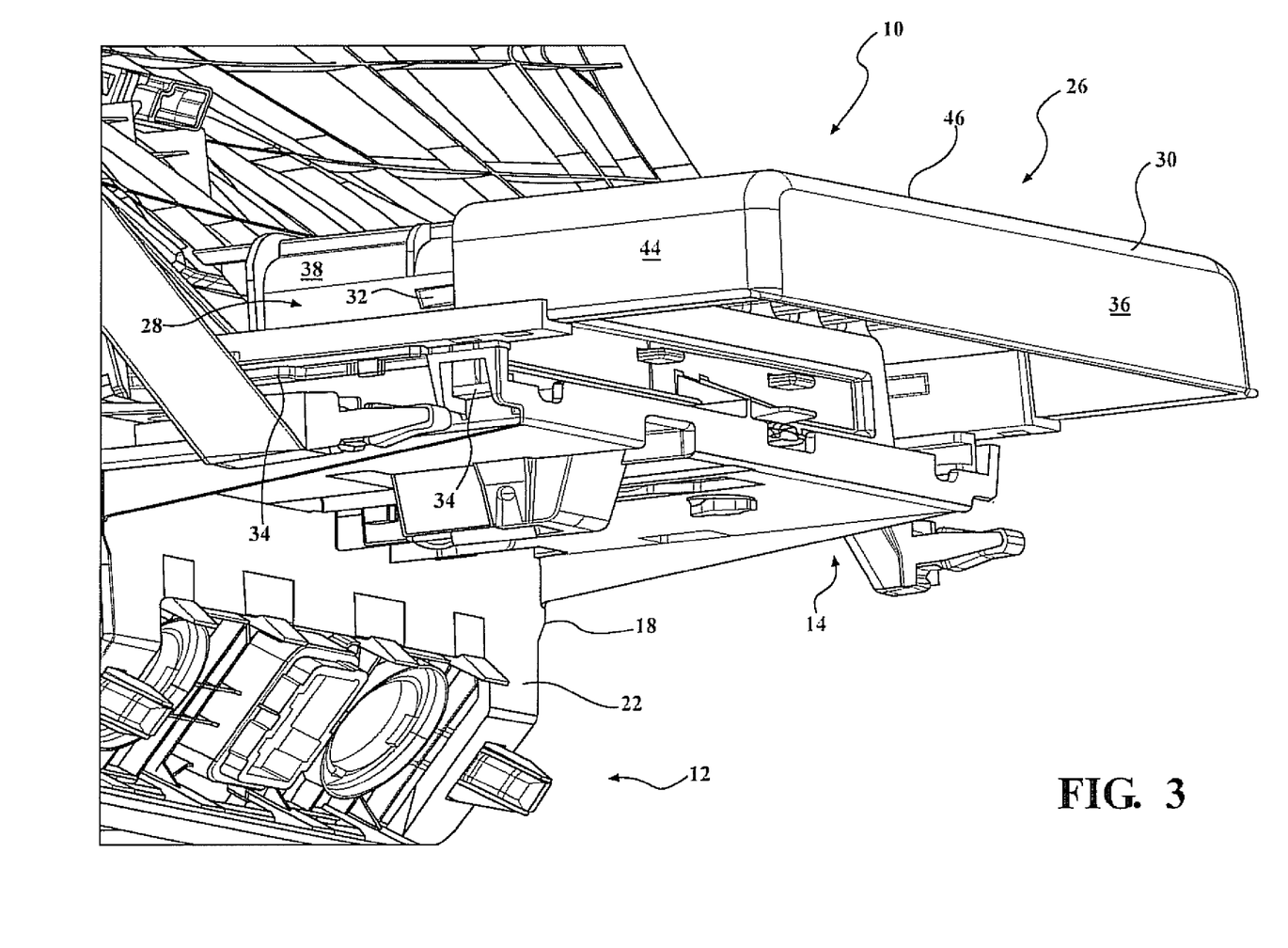
FIG. 3 is a perspective view of the back side of the storage compartment in the extended position.

The first top portion 28 includes a mounting portion 34 configured to fixedly mounted to the support portion 14 of the base 12. The first top portion 28 may include a plurality of mounting portions 34. As shown in FIGS. 2 and 3, the mounting portions 34 are configured to attach the first portion to support portions 14 of the base 12. The support portion 14 is shown as a generally planar member disposed on a back surface of the base 12, extending rearwardly from the back wall 22 of the base 12 as viewed from the cabin space of the vehicle. One of the mounting portions 34 is a tab extending downwardly and in a pinching engagement with a clasp of the support portion 14.

The second top portion 30 is movable between a retracted position and an extended position, in the retracted position the second top portion 30 is substantially disposed over the first top portion 28, in the extended position, the second back wall 36 of the second top portion 30 is displaced from the first top portion 28. Once the second top portion 30 of the cover 26 is moved to the extended position, the stop 32 engages the second top portion 30 so as to prevent the second top portion 30 from moving to the retracted position.

The first top portion 28 includes a pair of first side walls 38, and a first top wall 40. The first top wall 40 extends between each of the pair of first side walls 38 and each of the first side walls 38 generally orthogonal to the first top wall 40. The front and back of the first top portion 28 are open so as to form a generally "U" shaped cross section as taken from a line extending between opposing first side walls 38. The first top and first side walls 40, 38 may further include ribs 42 extending the width of the first top portion 28 to provide structural reinforcement to the first top portion 28.

The second top portion 30 dimensioned so as to place the first top portion 28 between each of the pair of second side walls 44 when the second top portion 30 is in the retracted position. The second top portion 30 may further include a pair of second side walls 44, a second top wall 46, and a second back wall 36. The second top wall 46 extends between each of the second side walls 44. The second side walls 44 are generally orthogonal to the second top wall 46. The second back wall 36 is disposed at the end of the second top wall 46 between each of the second side walls 44 so as to form an opening for receiving the first top portion 28. The first top portion 28 is slidable between the second side walls 44 of the second top portion 30.

The stop 32 is configured to retain the second top portion 30 in a fixed position with the first top portion 28 after the first and second top portions 28, 30 are displaced relative to each other. The stop 32 may be disposed on the first top portion 28. Specifically, the stop 32 may be disposed on an exterior surface of one of the pair of first side walls 38, the stop 32 being a generally resilient member and operable to engage a free edge 48 of one of the second side walls 44 so as to retain the second top portion 30 in the retracted position.

In operation, the stop 32 is biased inwardly with respect to an inner surface of the second side wall 44 when the cover 26 is in the retracted position. As the cover 26 is slid to the extended position, a free edge 48 of the second side wall 44 clears the stop 32 so as to allow the stop 32 to extend outwardly past the outer surface 50 of the second side wall 44. Thus, the stop 32 prevents the second top portion 30 from moving forward back into the retracted position. It should be appreciated that the cover 26 may include a pair of stops 32, one on each outer surface 50 of respective first side walls 38.

The stop 32 may include a ramp 52 having a sliding wall 54 and a contact wall 56, the sliding wall 54 angled relative to the exterior surface of one of the pair of first side walls 38. The sliding wall 54 is pressed inwardly with respect to the inner spaces of the cover 26 when the cover 26 is in the retracted position. When the cover 26 is moved to the extended position, the inner surface of the second wall slides against the sliding wall 54 of the stop 32. The contact wall 56 is also pushed inwardly, and is free to fully extend past the outer surface 50 of the first side wall 38 once the second side wall 44 has moved past the contact wall 56. The contact wall 56 is generally orthogonal to the exterior surface of one of the pair of first side walls 38 and protects outwardly so as to prevent the second side wall 44 from moving towards the retracted position.

Figure 4:
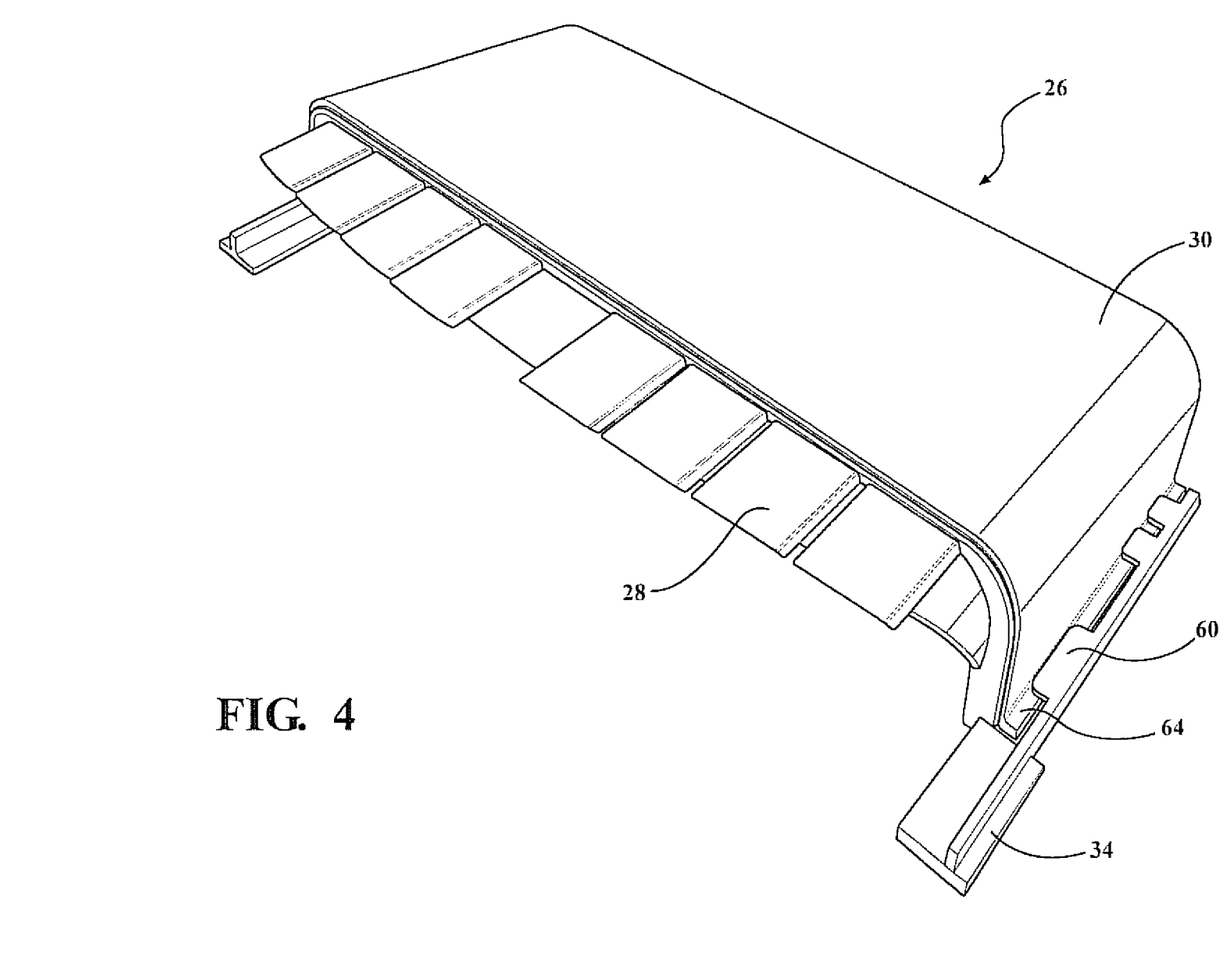
FIG. 4 is a perspective view of the cover in the retracted position.
Figure 5:
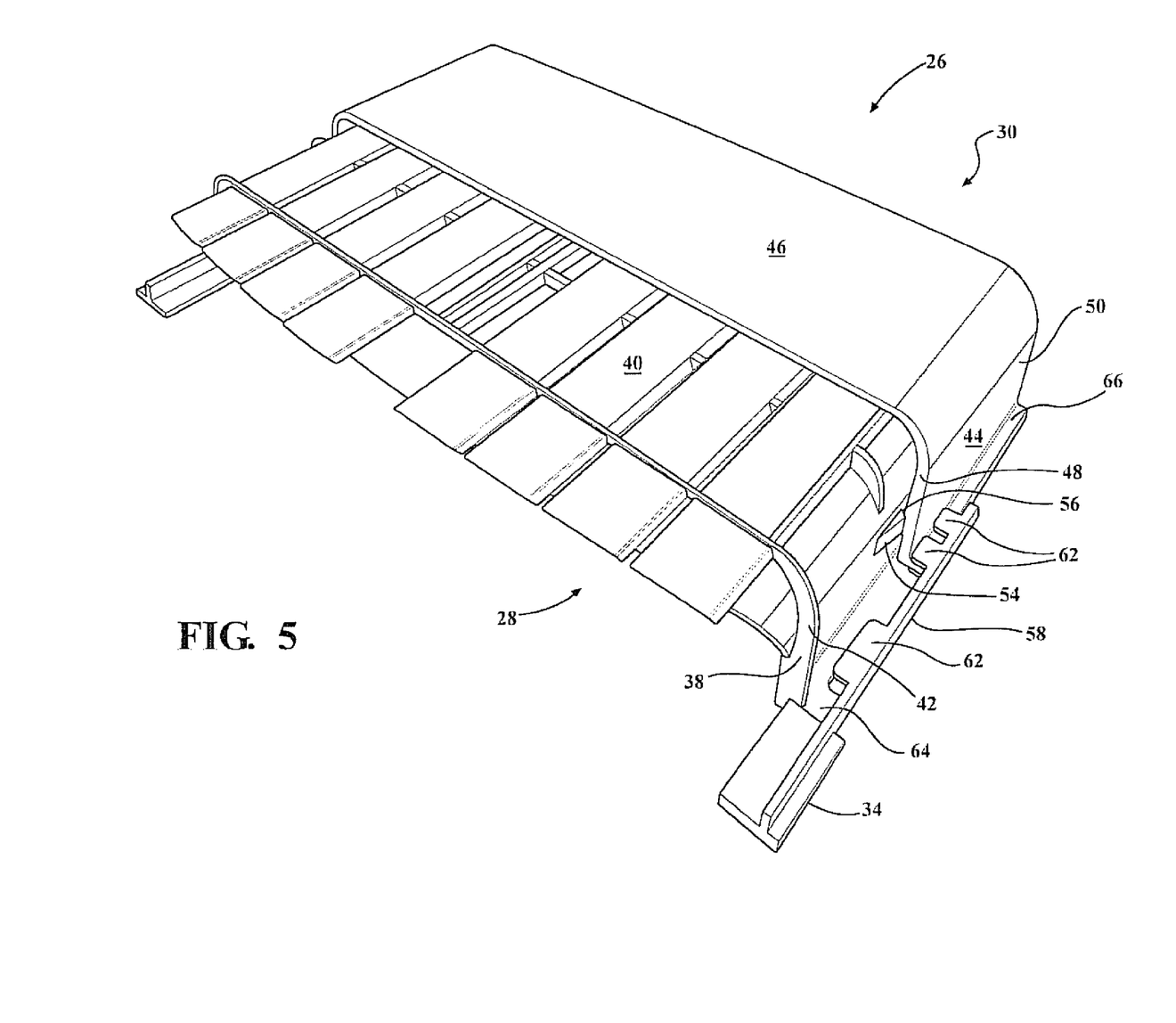
FIG. 5 is a perspective view of the cover in the extended position.
Figure 6:
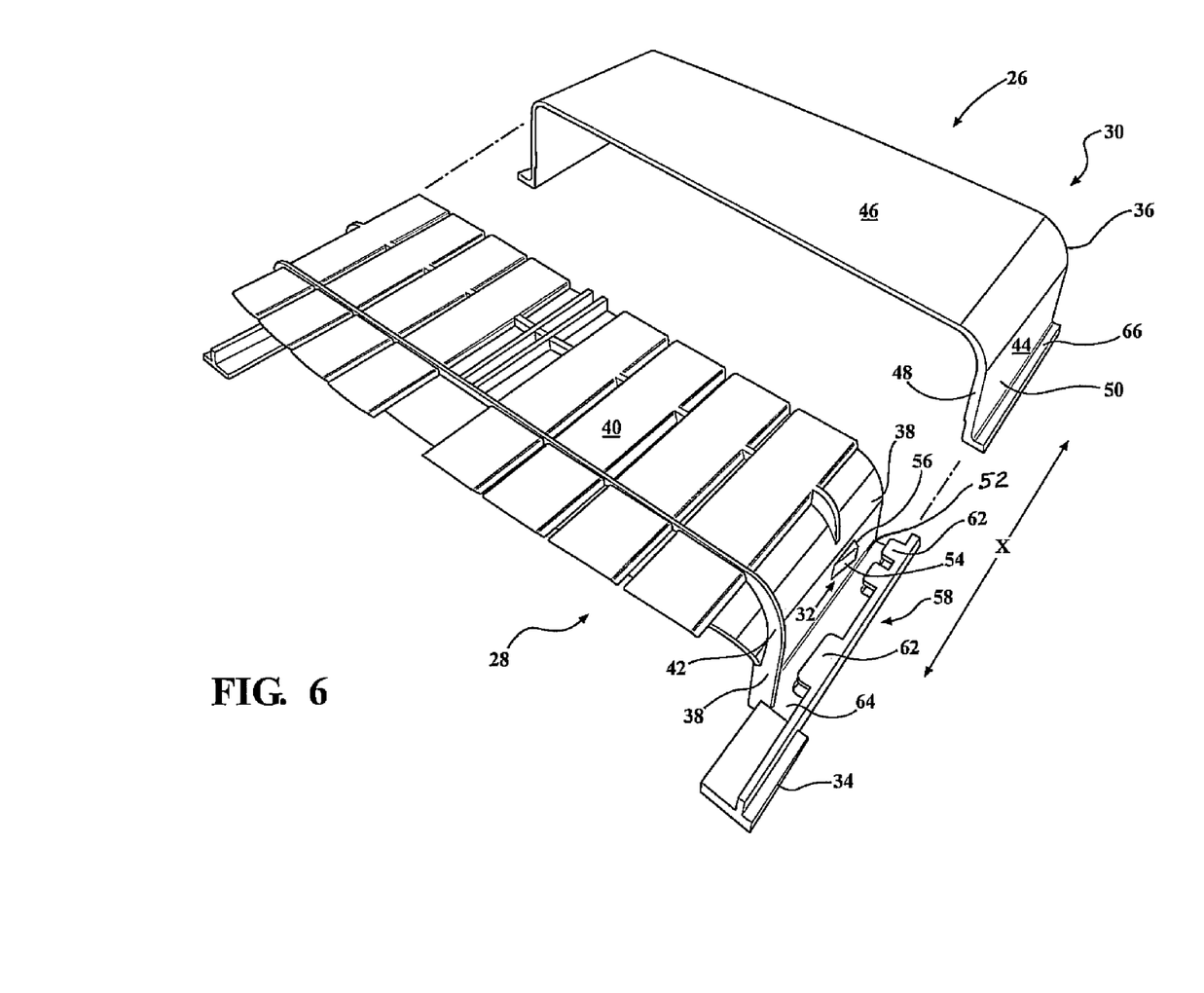
FIG. 6 is an exploded view of the cover.

With reference now to FIGS. 4-6, an illustrative embodiment of the cover 26 is provided. The cover 26 is configured so as to allow the first and second top portions 28, 30 to be displaced from each other along an axis defined by the line labeled "X". The first top portion 28 may include a pair of first flanges 58. Each of the first flanges 58 extending axially along a bottom edge of a respective first side wall 38. The first flanges 58 further extending outwardly from an outer surface 50 of respective first side walls 38.

Each of the first flanges 58 further including a retaining member 62 spaced apart from a sliding surface 64 of the first flange 58. The retaining members 62 are shown as a generally planar member disposed above the sliding surface 64 of the first flange 58. The retaining members 62 are fixedly disposed on a distal edge of the first flange 58 and are configured to hold the second top portion 30 in sliding engagement with the first top portion 28.

The second top portion 30 further includes a pair of second flanges 66. Each of the second flanges 66 extending axially along a bottom edge of a respective second side wall 44. Each of the second flanges 66 further extending outwardly from an outer surface 50 of the respective second side wall 44. The second flanges 66 are fixedly formed to respective bottom edges of the second side wall 44 and are dimensioned to slidingly fit between the sliding surface 64 of the first flange 58 and the retaining member 62.

Figure 1:
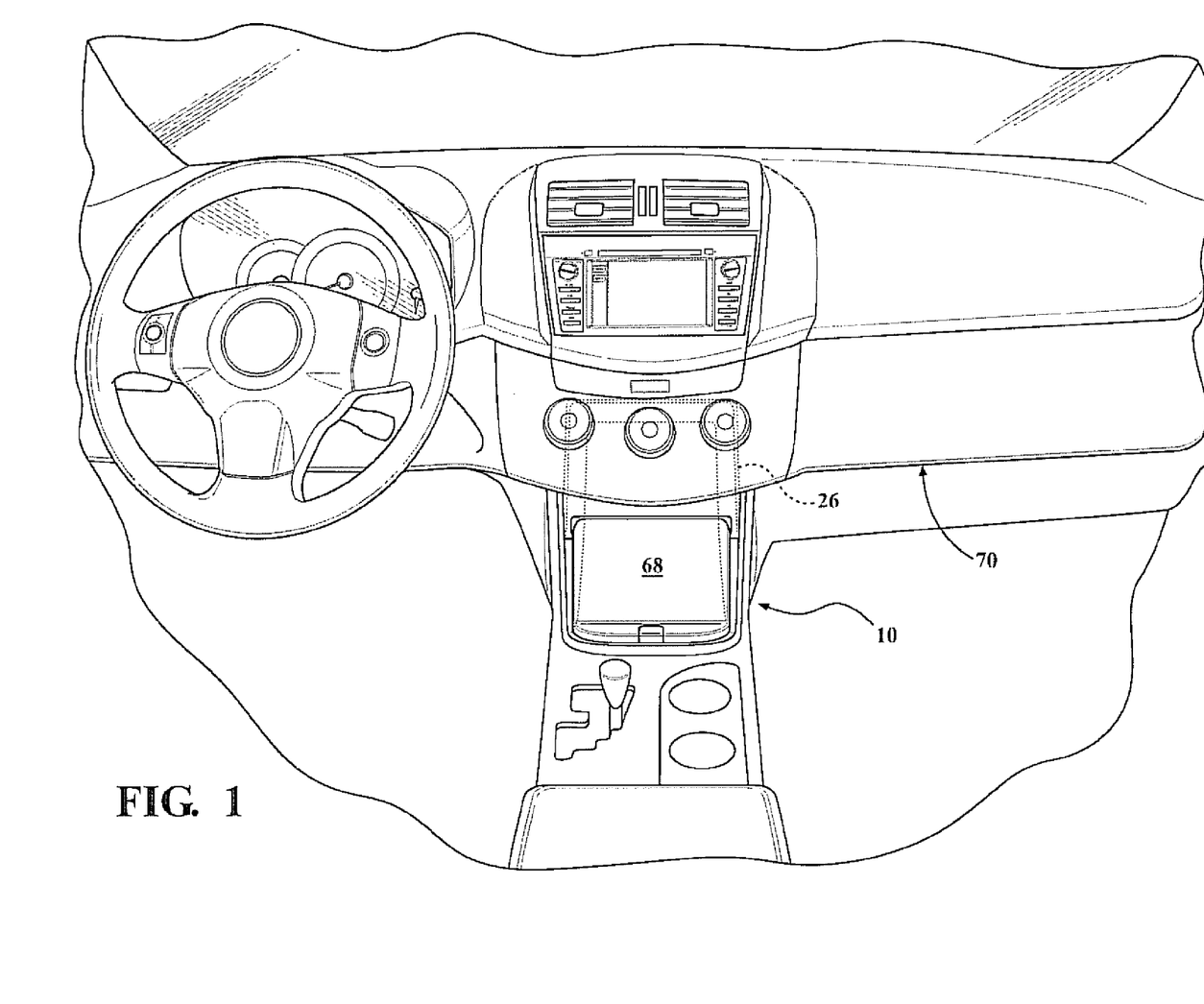
FIG. 1 is a perspective view of the interior of an automotive vehicle showing the instrument panel assembly.
Figure 7:
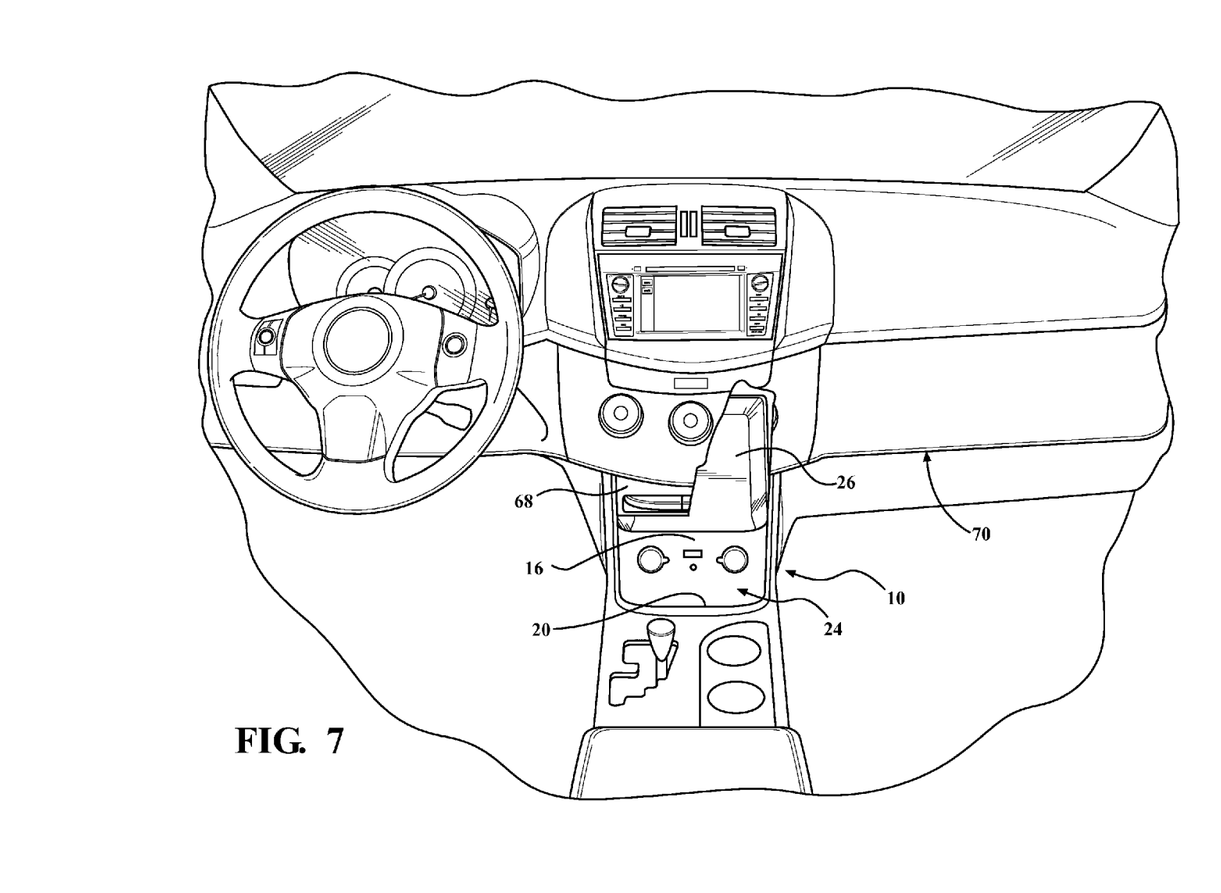
FIG. 7 is a perspective view of the instrument panel assembly of FIG. 1, showing the tray in the second position.

The storage compartment 10 may further include a tray 68 spaced apart from the bottom wall 16. The tray 68 may be slidably disposed between each of the side walls 18. The tray 68 is movable between a first position, wherein the tray 68 covers the bottom wall 16 as shown in FIG. 1, and a second position, wherein the tray 68 provides access to the storage bin 24 and is positioned underneath the cover 26 as shown in FIG. 7.

The cover 26 is dimensioned to fit over the tray 68 when in the extended position. When in the first position, the back edge of the tray 68 may be underneath a forward portion of the first top portion 28. When in the second position, the tray 68 in its entirety is generally disposed underneath the cover 26 when the cover 26 is in the extended position.

The tray 68 is slidably disposed within the storage compartment 10. The tray 68 is spaced apart from the bottom wall 16 and between the side walls 18 of the base 12. In operation, the cover 26 is formed and provided in the retracted position. The cover 26 is then mounted to the base 12, wherein the mounting portion 34 is attached to the support portion 14. The first top portion 28 is thus fixed to the base 12, and the second top portion 30 is slid into the extended position. The second top portion 30 is moved past to the stop 32 so as to allow the stop 32 to prevent the second top portion 30 from advancing to the retracted position. The tray 68 may then be free to slide between the first position and the second position. In the first position, the tray 68 covers the bottom wall 16 of the base 12, as shown in FIG. 1. In the second position, the tray 68 is slid away from the front wall 20 and disposed underneath the cover 26, as seen in FIG. 7.

According to another aspect of the invention an instrument panel assembly 70 is provided. The instrument panel assembly 70 includes a slidable tray 68 disposed over a base 12. The base 12 may further include includes a bottom wall 16, a pair of side walls 18, a front wall 20 and a back wall 22, the bottom, side, front and back walls 16, 18, 20, 22 interconnected so as to define a storage bin 24. The storage bin 24 may include outlets for providing electrical power such as a USB port or a cigarette lighter.

The tray 68 is slidable between a first position and a second position, in the first position the tray 68 covers 26 the bottom wall 16, as seen in FIGS. 1 and 7, in the second position the tray 68 is displaced from the front wall 20 and substantially behind the back wall 22 and an outer surface 50 of the instrument panel assembly 70 so as to provide access to the storage bin 24. Accordingly, users may place objects on top of the tray 68 and keep the objects there while still gaining access to the contents of the storage bin 24.

The base 12 may further include a support portion 14. The support portion 14 may be a generally planar surface adapted to receive a fastening device such as a screw or an adhesive, alternatively, the support portion 14 may provide a surface for a component to be vibrationally welded thereto. The support portion 14 may be disposed on an upper edge of one of the side walls 18, or on both of the side walls 18.

The instrument panel assembly 70 further includes a cover 26 having a first top portion 28 and a second top portion 30 displaceable with respect to the first top portion 28. The cover 26 may be made from a durable and resilient material such as injected molded polymers. The cover 26 is disposed above the base 12. The cover 26 includes a first top portion 28, a second top portion 30, and a stop 32. The first and second top portions 28, 30 are displaceable with respect to each other along an axis so as to form a telescopic cover 26.

The first top portion 28 is fixedly mounted to the support portion 14 of the base 12 so as to place the cover 26 behind the outer surface 50 of the instrument panel assembly 70 as shown in FIGS. 1 and 2. The second top portion 30 is movable between a retracted position and an extended position, in the retracted position the second top portion 30 is substantially disposed over the first top portion 28, in the extended position, the second back wall 36 of the second top portion 30 is displaced from the first top portion 28. Once the second top portion 30 of the cover 26 is moved to the extended position, the stop 32 engages the second top portion 30 so as to prevent the second top portion 30 from moving to the retracted position.

The first top portion 28 includes a pair of first side walls 38, and a first top wall 40. The first top wall 40 extends between each of the pair of first side walls 38 and each of the first side walls 38 generally orthogonal to the first top wall 40. The front and back of the first top portion 28 are open so as to form a generally "U" shaped cross section as taken from a line extending between opposing first side walls 38. The first top and first side walls 40, 38 may further include ribs 42 extending the width of the first top portion 28 to provide structural reinforcement to the first top portion 28.

The second top portion 30 dimensioned so as to place the first top portion 28 between each of the pair of second side walls 44 when the second top portion 30 is in the retracted position. The second top portion 30 may further include a pair of second side walls 44, a second top wall 46, and a second back wall 36. The second top wall 46 extends between each of the second side walls 44. The second side walls 44 are generally orthogonal to the second top wall 46. The second back wall 36 is disposed at the end of the second top wall 46 between each of the second side walls 44 so as to form an opening for receiving the first top portion 28. The first top portion 28 is slidable between the second side walls 44 of the second top portion 30.

The stop 32 is configured to retain the second top portion 30 in a fixed position with the first top portion 28 after the first and second top portions 28, 30 are displaced relative to each other. The stop 32 may be disposed on the first top portion 28. Specifically, the stop 32 may be disposed on an exterior surface of one of the pair of first side walls 38, the stop 32 being a generally resilient member and operable to engage a free edge 48 of one of the second side walls 44 so as to retain the second top portion 30 in the retracted position.

In operation, the stop 32 is biased inwardly with respect to an inner surface of the second side wall 44 when the cover 26 is in the retracted position. As the cover 26 is slid to the extended position, a free edge 48 of the second side wall 44 clears the stop 32 so as to allow the stop 32 to extend outwardly past the outer surface 50 of the second side wall 44. Thus, the stop 32 prevents the second top portion 30 from moving forward back into the retracted position. It should be appreciated that the cover 26 may include a pair of stops 32, one on each outer surface 50 of respective first side walls 38.

The stop 32 may include a ramp 52 having a sliding wall 54 and a contact wall 56, the sliding wall 54 angled relative to the exterior surface of one of the pair of first side walls 38. The sliding wall 54 is pressed inwardly with respect to the inner spaces of the cover 26 when the cover 26 is in the retracted position. When the cover 26 is moved to the extended position, the inner surface of the second wall slides against the sliding wall 54 of the stop 32. The contact wall 56 is also pushed inwardly, and is free to fully extend past the outer surface 50 of the first side wall 38 once the second side wall 44 has moved past the contact wall 56. The contact wall 56 is generally orthogonal to the exterior surface of one of the pair of first side walls 38 and protects outwardly so as to prevent the second side wall 44 from moving towards the retracted position.

With reference now to FIG. 2 and again to FIGS. 4-6, an illustrative embodiment of the instrument panel assembly 70. The cover 26 is configured so as to allow the first and second top portions 28, 30 to be displaced from each other along an axis defined by the line labeled "X". The first top portion 28 may include a pair of first flanges 58. Each of the first flanges 58 extending axially along a bottom edge of a respective first side wall 38. The first flanges 58 extend outwardly from an outer surface 50 of respective first side walls 38.

Each of the first flange 58 further including a retaining member 62 spaced apart from a sliding surface 64 of the first flange 58. The retaining members 62 are shown as a generally planar member disposed above the sliding surface 64 of the first flange 58. The retaining members 62 are fixedly disposed on a distal edge of the first flange 58 and are configured to hold the second top portion 30 in sliding engagement with the first top portion 28.

The second top portion 30 further includes a pair of second flanges 66. Each of the second flanges 66 extending axially along a bottom edge of a respective second side wall 44. Each of the second flanges 66 further extending outwardly from an outer surface 50 of the respective second side wall 44. The second flanges 66 are fixedly formed to respective bottom edges of the second side wall 44 and are dimensioned to slidingly fit between the sliding surface 64 of the first flange 58 and the retaining member 62.

According to yet another aspect of the invention, a method of assembling an instrument panel assembly 70 is provided. The instrument panel assembly 70 includes a storage compartment 10 having a slidable tray 68. The storage compartment 10 includes a base 12 having a bottom wall 16, a pair of side walls 18, a front wall 20 and a back wall 22, the bottom, side, front and back walls 16, 18, 20, 22 interconnected so as to define a storage bin 24. The slidable tray 68 is disposed above the storage bin 24 and is movable between a first position and a second position. In the first position the tray 68 covers 26 the storage bin 24, as seen in FIGS. 1 and 7, in the second position the tray 68 is displaced from the front wall 20 and a portion of the tray 68 is displaced behind the outer surface 50 of the instrument panel assembly 70 so as to provide access to the storage bin 24.

Figure 8:
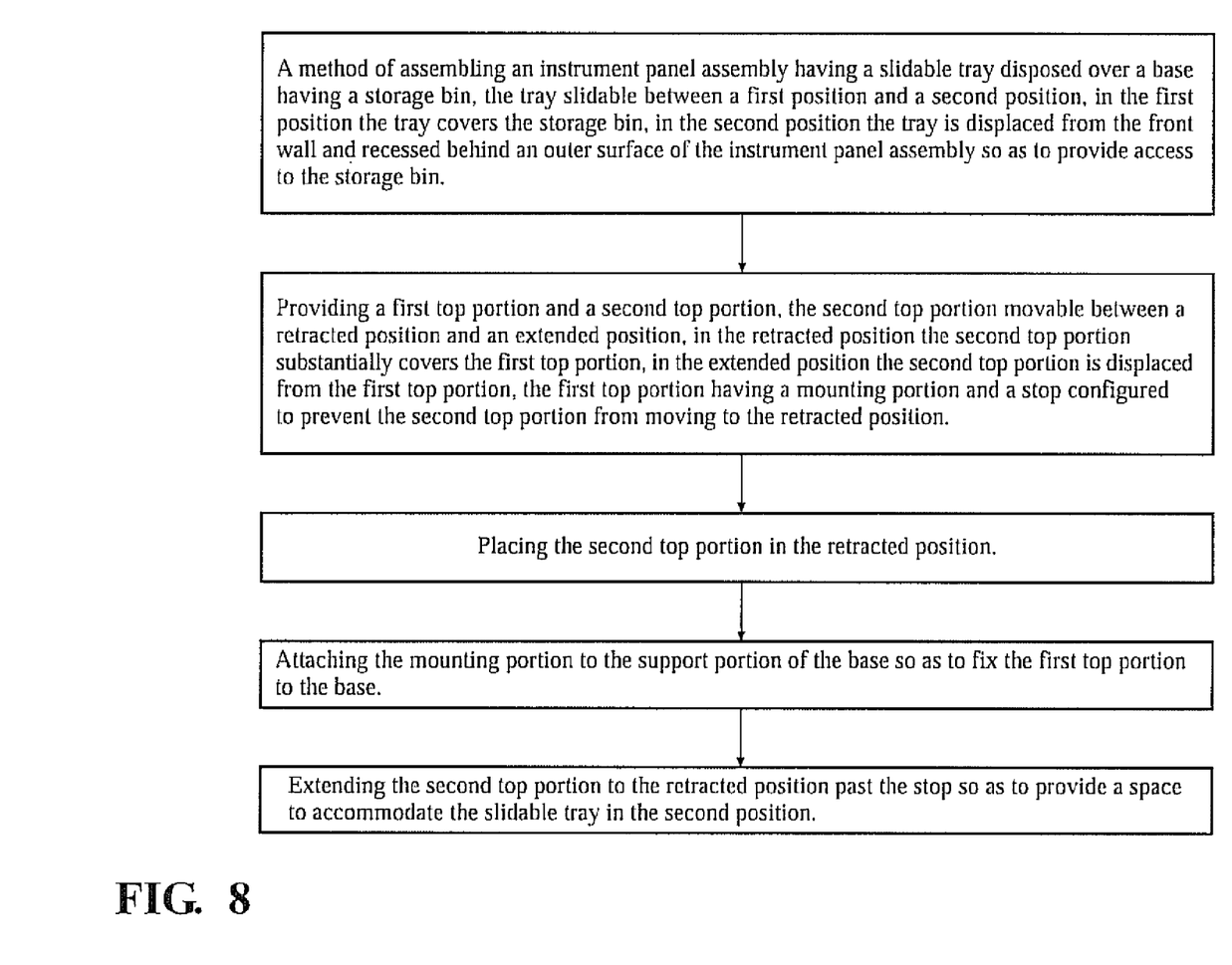
FIG. 8 is a diagram showing the steps of a method for installing a storage compartment.

The method of assembling the instrument panel assembly 70 includes the steps of providing a cover 26 having a first top portion 28 and a second top portion 30 displaceable with respect to the first top portion 28. The first top portion 28 includes a mounting portion 34 and a stop 32 configured to prevent the second top portion 30 from moving to the retracted position. The second top portion 30 is movable between a retracted position and an extended position, in the retracted position the second top portion 30 is substantially disposed over the first top portion 28, in the extended position, the second back wall 36 of the second top portion 30 is displaced from the first top portion 28 so as to accommodate the tray 68 when the tray 68 is in the second position.

The method proceeds to the step of placing the cover 26 in the retracted position and attaching the mounting portion 34 to the support portion 14 of the base 12 so as to fix the first top portion 28 to the base 12. The method proceeds to the step of extending the second top portion 30 to the retracted position past the stop 32 so as to provide a space to accommodate the slidable tray 68 in the second position.

The first top portion 28 includes a pair of first side walls 38, and a first top wall 40. The first top wall 40 extends between each of the pair of first side walls 38 and each of the first side walls 38 generally orthogonal to the first top wall 40. The front and back of the first top portion 28 are open so as to form a generally "U" shaped cross section as taken from a line extending between opposing first side walls 38. The first top and first side walls 40, 38 may further include ribs 42 extending the width of the first top portion 28 to provide structural reinforcement to the first top portion 28.

The second top portion 30 dimensioned so as to place the first top portion 28 between each of the pair of second side walls 44 when the second top portion 30 is in the retracted position. The second top portion 30 may further include a pair of second side walls 44, a second top wall 46, and a second back wall 36. The second top wall 46 extends between each of the second side walls 44. The second side walls 44 are generally orthogonal to the second top wall 46. The second back wall 36 is disposed at the end of the second top wall 46 between each of the second side walls 44 so as to form an opening for receiving the first top portion 28. The first top portion 28 is slidable between the second side walls 44 of the second top portion 30.

The stop 32 is configured to retain the second top portion 30 in a fixed position with the first top portion 28 after the first and second top portions 28, 30 are displaced relative to each other. The stop 32 may be disposed on the first top portion 28. Specifically, the stop 32 may be disposed on an exterior surface of one of the pair of first side walls 38, the stop 32 being a generally resilient member and operable to engage a free edge 48 of one of the second side walls 44 so as to retain the second top portion 30 in the retracted position.

In operation, the stop 32 is biased inwardly with respect to an inner surface of the second side wall 44 when the cover 26 is in the retracted position. As the cover 26 is slid to the extended position, a free edge 48 of the second side wall 44 clears the stop 32 so as to allow the stop 32 to extend outwardly past the outer surface 50 of the second side wall 44. Thus, the stop 32 prevents the second top portion 30 from moving forward back into the retracted position. It should be appreciated that the cover 26 may include a pair of stops 32, one on each outer surface 50 of respective first side walls 38.

The stop 32 may include a ramp 52 having a sliding wall 54 and a contact wall 56, the sliding wall 54 angled relative to the exterior surface of one of the pair of first side walls 38. The sliding wall 54 is pressed inwardly with respect to the inner spaces of the cover 26 when the cover 26 is in the retracted position. When the cover 26 is moved to the extended position, the inner surface of the second wall slides against the sliding wall 54 of the stop 32. The contact wall 56 is also pushed inwardly, and is free to fully extend past the outer surface 50 of the first side wall 38 once the second side wall 44 has moved past the contact wall 56. The contact wall 56 is generally orthogonal to the exterior surface of one of the pair of first side walls 38 and protects outwardly so as to prevent the second side wall 44 from moving towards the retracted position.

With reference now to FIG. 2 and again to FIGS. 4-6, an illustrative embodiment of the instrument panel assembly 70. The cover 26 is configured so as to allow the first and second top portions 28, 30 to be displaced from each other along an axis defined by the line labeled "X". The first top portion 28 may include a pair of first flanges 58. Each of the first flanges 58 extending axially along a bottom edge of a respective first side wall 38. The first flanges 58 further extending outwardly from an outer surface 50 of respective first side walls 38.

Each of the first flange 58 further including a retaining member 62 spaced apart from a sliding surface 64 of the first flange 58. The retaining members 62 are shown as a generally planar member disposed above the sliding surface 64 of the first flange 58. The retaining members 62 are fixedly disposed on a distal edge of the first flange 58 and are configured to hold the second top portion 30 in sliding engagement with the first top portion 28.

The second top portion 30 further includes a pair of second flanges 66. Each of the second flanges 66 extending axially along a bottom edge of a respective second side wall 44. Each of the second flanges 66 further extending outwardly from an outer surface 50 of the respective second side wall 44. The second flanges 66 are fixedly formed to respective bottom edges of the second side wall 44 and are dimensioned to slidingly fit between the sliding surface 64 of the first flange 58 and the retaining member 62.

Obviously, many modifications and variations of the present invention are possible in light of the above teachings and may be practiced otherwise than as specifically described while within the scope of the appended claims.

The invention claimed is:

1. A storage compartment comprising:
    a base having a support portion; and
    a first top portion and a second top portion displaceable with respect to the first top portion, the first top portion having a mounting portion, a pair of first side walls, and a first top wall extending between each of the first side walls, each of the first side walls generally orthogonal to the first top wall and a stop disposed on an exterior surface of one of the pair of first side walls, the stop includes a ramp having a sliding wall and a contact wall, the sliding wall angled relative to the exterior surface of one of the pair of first side walls, the contact wall generally orthogonal to the exterior surface of one of the pair of first side walls, the mounting portion fixedly mounted to the support portion of the base, the second top portion having a second back wall, the second top portion movable between a retracted position and an extended position, in the retracted position the second top portion is substantially disposed over the first top portion, in the extended position, the second back wall of the second top portion is displaced from the first top portion.

2. The storage compartment as set forth in claim 1, wherein the base includes a bottom wall, a pair of side walls, a front wall and a back wall, the bottom, side, front and back walls interconnected so as to define a storage bin, the support portion disposed on one of the pairs of side walls.

3. The storage compartment as set forth in claim 2, wherein the second top portion further includes a pair of second side walls, a second top wall, the second top portion dimensioned so as to place the first top portion between each of the pair of second side walls when the second top portion is in the retracted position.

4. The storage compartment as set forth in claim 3, wherein the stop is a generally resilient member and is operable to engage a free edge of one of the second side walls so as to retain the second top portion in the retracted position.

5. The storage compartment as set forth in claim 4, wherein the first top portion further includes a pair of first flanges, each of the first flanges extending axially along a bottom edge of a respective first side wall, the each of the first flanges further extending outwardly from an outer surface of the respective first side wall, each of the first flange further including a retaining member spaced apart from a sliding surface of the first flange.

6. The storage compartment as set forth in claim 5, wherein the second top portion further includes a pair of second flanges, each of the second flanges extending axially along a bottom edge of a respective second side wall, the each of the second flanges further extending outwardly from an outer surface of the respective second side wall and dimensioned to slidingly fit between the sliding surface of the first flange and the retaining member.

7. The storage compartment as set forth in claim 6, further including a tray spaced apart from the bottom wall, the tray movable between a first position wherein the tray covers the bottom wall and a second position wherein the tray provides access to the storage bin.

8. An instrument panel assembly having a slidable tray disposed over a base having a bottom wall, a pair of side walls, a front wall, a back wall, and a support portion, the bottom, side, front and back walls interconnected so as to define a storage bin, the tray slidable between a first position and a second position, in the first position the tray covers the bottom wall, in the second position the tray is displaced from the front wall so as to provide access to the storage bin, the instrument panel assembly comprising:
    a first top portion and a second top portion displaceable with respect to the first top portion, the first top portion having a mounting portion and a stop, the mounting portion fixedly mounted to the support portion of the base, the second top portion having a second back wall, the second top portion movable between a retracted position and an extended position, in the retracted position the second top portion is substantially disposed over the first top portion, in the extended position, the second back wall of the second top portion is displaced from the first top portion so as to accommodate the tray when the tray is in the second position.

9. The instrument panel assembly as set forth in claim 8, wherein the first top portion includes a pair of first side walls, and a first top wall extending between each of the first side walls, each of the first side walls generally orthogonal to the first top wall.

10. The instrument panel assembly as set forth in claim 9, wherein the second top portion further includes a pair of second side walls, a second top wall, the second top portion dimensioned so as to place the first top portion between each of the pair of second side walls when the second top portion is in the retracted position.

11. The instrument panel assembly as set forth in claim 10, wherein the stop is disposed on an exterior surface of one of the pair of first side walls, the stop being a generally resilient member and operable to engage a free edge of one of the second side walls so as to retain the second top portion in the retracted position.

12. The instrument panel assembly as set forth in claim 11, wherein the stop includes a ramp having a sliding wall and a contact wall, the sliding wall angled relative to the exterior surface of one of the pair of first side walls, the contact wall generally orthogonal to the exterior surface of one of the pair of first side walls.

13. The instrument panel assembly as set forth in claim 12, wherein the first top portion further includes a pair of first flanges, each of the first flanges extending axially along a bottom edge of a respective first side wall, the each of the first flanges further extending outwardly from an outer surface of the respective first side wall, each of the first flange further including a retaining member spaced apart from a sliding surface of the first flange.

14. The instrument panel assembly as set forth in claim 13, wherein the second top portion further includes a pair of second flanges, each of the second flanges extending axially along a bottom edge of a respective second side wall, the each of the second flanges further extending outwardly from an outer surface of the respective second side wall and dimensioned to slidingly fit between the sliding surface of the first flange and the retaining member.

15. A method of assembling an instrument panel assembly, the instrument panel assembly having a slidable tray disposed over a base having a bottom wall, a pair of side walls, a front wall and a back wall, the bottom, side, front and back walls interconnected so as to define a storage bin, the tray slidable between a first position and a second position, in the first position the tray covers the bottom wall, in the second position the tray is displaced from the front wall so as to provide access to the storage bin, the method comprising the steps of:

providing a first top portion and a second top portion displaceable, the second top portion movable between a retracted position and an extended position, the first top portion having a mounting portion and a stop configured to prevent the second top portion from moving to the retracted position, the second top portion having a second back wall, in the retracted position the second top portion is substantially disposed over the first top portion, in the extended position, the second back wall of the second top portion is displaced from the first top portion so as to accommodate the tray when the tray is in the second position;

placing the second top portion in the retracted position;

attaching the mounting portion to the support portion of the base so as to fix the first top portion to the base;

extending the second top portion to the extended position past the stop so as to provide a space to accommodate the slidable tray in the second position.

16. The method of assembling an instrument panel assembly as set forth in claim 15, wherein the first top portion includes a pair of first side walls, and a first top wall extending between each of the first side walls, each of the first side walls generally orthogonal to the first top wall.

17. The method of assembling an instrument panel assembly as set forth in claim 16, wherein the second top portion further includes a pair of second side walls, a second top wall, the second top portion dimensioned so as to place the first top portion between each of the pair of second side walls when the second top portion is in the retracted position.

18. The method of assembling an instrument panel assembly as set forth in claim 17, wherein the stop is disposed on an exterior surface of one of the pair of first side walls, the stop being a generally resilient member and operable to engage a free edge of one of the second side walls so as to retain the second top portion in the retracted position.

19. The method of assembling an instrument panel assembly as set forth in claim 18, wherein the stop includes a ramp having a sliding wall and a contact wall, the sliding wall angled relative to the exterior surface of one of the pair of first side walls, the contact wall generally orthogonal to the exterior surface of one of the pair of first side walls.

20. The method of assembling an instrument panel assembly as set forth in claim 19, wherein the first top portion further includes a pair of first flanges, each of the first flanges extending axially along a bottom edge of a respective first side wall, the each of the first flanges further extending outwardly from an outer surface of the respective first side wall, each of the first flange further including a retaining member spaced apart from a sliding surface of the first flange.

21. The method of assembling an instrument panel assembly as set forth in claim 20, wherein the second top portion further includes a pair of second flanges, each of the second flanges extending axially along a bottom edge of a respective second side wall, the each of the second flanges further extending outwardly from an outer surface of the respective second side wall and dimensioned to slidingly fit between the sliding surface of the first flange and the retaining member.

* * * * *